United States Patent Office 2,940,772
Patented June 14, 1960

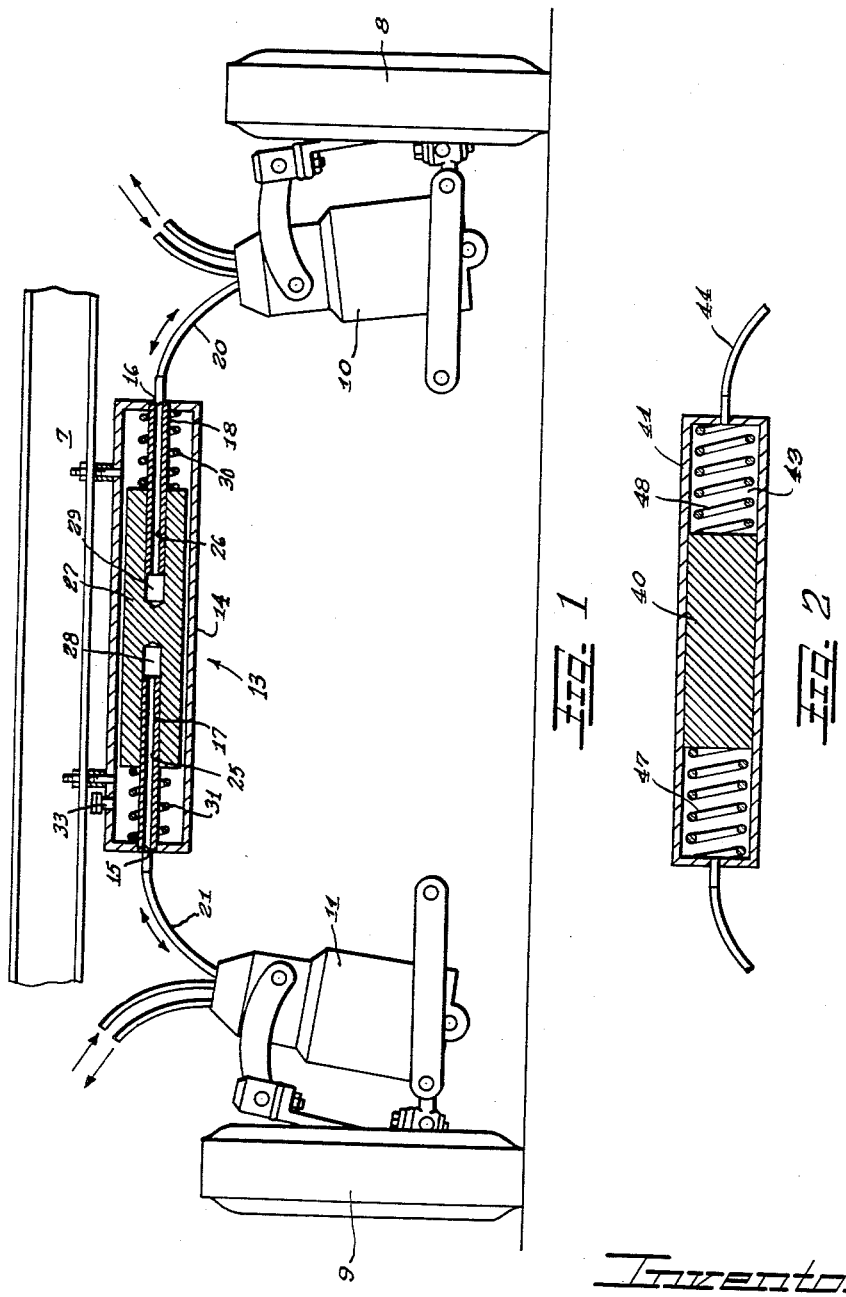

2,940,772
HYDRAULIC LEVELING MECHANISM

John P. Heiss, Flint, Mich., assignor to Thompson Ramo Wooldridge Inc., a corporation of Ohio Filed Apr. 18, 1958, Ser. No. 729,427

3 Claims. (Cl. 280—112)

This invention relates to a leveling mechanism for road vehicles and the like and more particularly relates to such a mechanism adapted to be used in conjunction with a hydraulic or a hydropneumatic spring system for road vehicles and the like.

It is a principal object of this invention to provide a leveling mechanism for road vehicles and the like which is operable to maintain the vehicle in a substantially level condition on turns and upon acceleration and deceleration of the vehicle.

It is a further object of this invention to provide a leveling mechanism for road vehicles and the like which is operable to pump up or stiffen one or more of the hydraulic or hydropneumatic springs for the road vehicle or the like in direct proportion to the tendency of the vehicle to roll and pitch.

It is another object of this invention to provide a leveling mechanism for road vehicles and the like of the type above described having substantially no hysteresis.

Yet another object of the invention is to provide a leveling mechanism for road vehicles and the like having their wheels suspended by hydraulic or hydropneumatic springs, which may be interposed hydraulically between any two of the springs to stabilize the vehicle by compensating hydraulic pressures within the springs.

A still further object of the invention is to provide a leveling mechanism for road vehicles and the like which can be actuated by gravitational or centrifugal force.

It is a still further object of this invention to provide a leveling mechanism for road vehicles and the like in which a weighted piston is operable under certain predetermined conditions to direct hydraulic fluid under pressure to or from one or more hydraulic or hydropneumatic springs associated with the wheels of a road vehicle or the like.

These and other objects of the invention will become apparent from time to time as the following specification proceeds and with reference to the accompanying drawings wherein:

Figure 1 is a vertical sectional view through a device constructed in accordance with the principles of this invention shown in conjunction with the front wheel assembly of a road vehicle; and Figure 2 is a vertical sectional view through a second embodiment of the invention constructed in accordance with the principles of this invention.

In the embodiment of the invention illustrated in Figure 1, a pair of hydropneumatic springs 10 and 11 are shown coupled with the right and left wheel assemblies 8 and 9 of a road vehicle for resiliently suspending the wheels thereof relative to frame 7 by means which are well known in the art. It will be understood that while the leveling strut associated with applicant's device may be of any suitable type which utilizes hydraulic fluid to resiliently suspend the wheels of the road vehicle, it may be of the type such as is shown and described in my copending application entitled Vehicle Suspension, filed on Dec. 28, 1956 and having Serial Number 631,319. Such a strut is of the hydropneumatic type and is provided with a fluid chamber into which hydraulic liquid under substantial pressure is fed. At the same time, liquid is permitted to flow from the chamber to a second chamber having a pneumatically supported resilient wall. Accordingly, upon collapse or compression of the strut chamber, the hydraulic liquid flows from the strut chamber into the second or hydropneumatic spring chamber, forcing the resilient wall thereof outwardly against pneumatic pressure. Upon release of the load previously causing compression of the strut chamber, the pneumatic pressure urges the fluid from the second chamber back into the strut chamber in a resilient manner thereby compensating for varying loads on the spring. As the load on one of the hydropneumatic springs is increased and as the spring tends to collapse or compress, hydraulic pressure is directed into the fluid chamber through a pressure supply line thus stiffening the collapsible spring to resist compression in direct proportion to the load applied to the spring.

It has been found in practice that hydropneumatic leveling struts have not been entirely satisfactory in overcoming hysteresis or time lag effect and, for this reason, the leveling mechanism of the present invention has been devised to compensate for the tendency of the vehicle to pitch during rapid acceleration or deceleration and to compensate for the tendency of the vehicle to roll on sharp turns or the like.

Accordingly, a leveling mechanism 13 has been devised to compensate for the hysteresis effect in hydraulic or hydropneumatic leveling struts associated with road vehicles. It comprises generally a casing 14 which may be cylindrical in shape and which may be connected to the frame 7 of a road vehicle.

Referring now particularly to Figure 1, it will be noted that ports 15 and 16 are formed in each end of the casing 14 and that a pair of conduits 17 and 18 extend through and are sealed to the ports 15 and 16, respectively. A pair of suitable hydraulic lines 20 and 21 serve to communicate the fluid chambers within the hydropneumatic leveling struts 10 and 11 with the interior of the casing 14 for reasons which will hereinafter become apparent.

A pair of opposing cylinders 25 and 26 are formed in each end of a weighted piston 27 and are arranged to slidably receive the inner ends of the conduits 17 and 18 in fluid tight relationship therewith for reasons which will hereinafter be explained more fully. The distance between the inner ends of the cylinders 25 and 26 is substantially smaller than the distance between the inner ends of the conduits 17 and 18, thus forming opposed fluid chambers 28 and 29 which are in hydraulic communication with the fluid chambers (not shown) in hydropneumatic leveling struts 10 and 11.

It will now be apparent that if the weighted piston 27, which is normally centered within the casing 14 by centering springs 30 and 31, moves toward one end of the cylinder 14 hydraulic fluid will be directed from one of the fluid chambers 28 or 29 into the conduit associated therewith and that simultaneously a partial vacuum will be created in the opposing fluid chamber.

Hence, if the road vehicle tends to roll to the right (as shown in Figure 1) the weighted piston 27 will be moved by gravitational and centrifugal force to the right to overcome the resistive force of the centering spring 30 and to thus force hydraulic fluid from the fluid chamber 29 through the conduit 18, the hydraulic line 20, and into the fluid chamber (not shown) of the hydropneumatic spring 10 to stiffen the spring to compensate for the tendency to roll. At the same time the movement of the weighted piston to the right will create a partial vacuum within the fluid chamber 28 to withdraw hydraulic fluid from the fluid chamber (not shown) of the hydropneumatic spring 11 to further compensate for the tendency to roll.

When the road vehicle has been leveled, the centering springs 30 and 31 will act to recenter the piston 27 as is shown in Figure 1. As is shown in Figure 1 a bleeder outlet 33 may be provided in the casing 14 to bleed any trapped air from the interior of the casing 14.

In the embodiment of the invention illustrated in Figure 2 the weighted piston 40 is shown as being a solid block and as slidably engaging the inner walls of the casing 41 and as being in substantially fluid tight relation therewith. This embodiment of the invention is to be preferred in conjunction with low pressure systems where it is desirable to move greater quantities of hydraulic fluid to and from the associated hydraulic or hydropneumatic spring.

Accordingly, the hydraulic lines 44 are suitably connected directly to the ends of the casing 41 and serve to communicate the interior 43 of the casing with the fluid chambers (not shown) in hydropneumatic or hydraulic springs (also not shown). A pair of centering springs 47 and 48 are provided at each end of the sliding piston 40 and abut the inner end walls of the casing 41 to reposition the piston 40 centrally within the casing 41 whenever the centrifugal or gravitational force acting on the piston 40 becomes unappreciable.

A device constructed in accordance with this embodiment of the invention is operable, of course, to direct hydraulic fluid to one leveling strut while withdrawing fluid from another in a manner similar to that hereinbefore described whenever the gravitational or centrifugal force acting on the piston 40 is great enough to overcome the resistive force of the centering springs 47 and 48.

Obviously, the stabilizing mechanism may be utilized between opposed side wheels of a vehicle to control roll or between the front and rear wheels of a vehicle to control pitch.

It is now apparent that a stabilizing mechanism has been provided which overcomes the disadvantages of mechanical anti-roll and anti-pitch devices which were encumbered with a high degree of reaction friction and hysteresis.

Furthermore, a stabilizing device has been provided to compensate for the hysteresis inherent in hydraulic or hydropneumatic suspension struts.

It will herein be understood that these embodiments of the invention have been used for illustrative purposes only and that various modifications and variations of the present invention may be effected without departing from the spirit and scope of the novel concepts thereof.

I claim as my invention:

1. A stabilizing mechanism for a road vehicle or the like having wheels individually resiliently suspended on a frame by bodies of hydraulic fluid confined in spring housings, comprising a casing, conduits extending through opposed end wall portions of said casing, hydraulic lines connected to said conduits, each of said hydraulic lines being operatively connected to one of said spring housings to hydraulically communicate the interior of said casing with the confined fluid of the spring, a weighted piston slidably mounted within said casing, bias means between each end of said piston and the end wall portions of said casing arranged to normally center said piston within said casing, opposed cylinders formed within said piston arranged to receive said conduits in fluid tight relation therewith, said piston being operable to be moved by gravitational or centrifugal force to overcome the resistive force of said bias means toward one end wall portion of said casing to force hydraulic fluid to one of said spring housings through its respective hydraulic line to stiffen that spring.

2. A stabilizing mechanism for a road vehicle or the like having wheels individually resiliently suspended on a frame by bodies of hydraulic fluid confined in spring housings, comprising a pair of coaxially aligned conduits communicable respectively with the confined fluid within at least two of said spring housings, a weighted piston having axial bores formed in opposite ends thereof for receiving said conduits slidably mounted on said conduits in fluid tight relation therewith, wherein said piston is operable to be axially moved by gravitational or centrifugal force to force hydraulic fluid to one of said spring housings through its respective conduit to stiffen that spring.

3. A stabilizing mechanism for a road vehicle or the like having wheels individually resiliently suspended on a frame by bodies of hydraulic fluid confined in spring housings, comprising a pair of coaxially aligned conduits communicable respectively with the confined fluid within at least two of said spring housings, a weighted piston having axial bores formed in opposite ends thereof for receiving said conduits slidably mounted on said conduits in fluid tight relation therewith, said conduits comprising the sole supporting means for said piston, wherein said piston is operable to be axially moved by gravitational or centrifugal force to force hydraulic fluid to one of said spring housings through its respective conduit to stiffen that spring.

References Cited in the file of this patent

UNITED STATES PATENTS

| | | |
|---|---|---|
| 1,110,737 | Benham | Sept. 15, 1914 |
| 2,703,718 | Hutchinson | Mar. 8, 1955 |

FOREIGN PATENTS

| | | |
|---|---|---|
| 857,436 | France | Apr. 15, 1940 |